(12) United States Patent
Fernandez-Galindo et al.

(10) Patent No.: US 12,738,560 B2
(45) Date of Patent: Sep. 15, 2026

(54) TRACTION BATTERY PACK THERMAL MANAGEMENT ASSEMBLY AND THERMAL MANAGEMENT METHOD

(71) Applicant: Ford Global Technologies, LLC, Dearborn, MI (US)

(72) Inventors: Francisco Fernandez-Galindo, Canton, MI (US); Jason Luke Sielaff, Brighton, MI (US); Daniel Paul Roberts, Livonia, MI (US); Liam E. West, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1015 days.

(21) Appl. No.: 17/960,916

(22) Filed: Oct. 6, 2022

(65) Prior Publication Data

US 2024/0120572 A1 Apr. 11, 2024

(51) Int. Cl.

| | |
|---|---|
| ***H01M 10/6554*** | (2014.01) |
| ***H01M 10/0525*** | (2010.01) |
| ***H01M 10/613*** | (2014.01) |
| ***H01M 10/625*** | (2014.01) |
| ***H01M 10/647*** | (2014.01) |
| ***H01M 10/6556*** | (2014.01) |
| ***H01M 10/6567*** | (2014.01) |
| ***H01M 50/211*** | (2021.01) |

(Continued)

(52) U.S. Cl.

CPC ... *H01M 10/6554* (2015.04); *H01M 10/0525* (2013.01); *H01M 10/613* (2015.04); *H01M 10/625* (2015.04); *H01M 10/647* (2015.04); *H01M 10/6556* (2015.04); *H01M 10/6567* (2015.04); *H01M 50/211* (2021.01); *H01M 50/249* (2021.01); *H01M 50/271* (2021.01); *H01M 50/505* (2021.01); *H01M 50/553* (2021.01); *H01M 50/591* (2021.01); *H01M 2220/20* (2013.01)

(58) Field of Classification Search

CPC ......... H01M 10/6554; H01M 10/0525; H01M 10/613; H01M 10/625; H01M 10/647; H01M 10/6556; H01M 10/6567; H01M 10/653; H01M 10/6553; H01M 10/633; H01M 10/6551; H01M 50/211; H01M 50/249; H01M 50/271; H01M 50/505; H01M 50/553; H01M 50/591; H01M 50/507; H01M 2220/20

See application file for complete search history.

(56) References Cited

U.S. PATENT DOCUMENTS

| | | | |
|---|---|---|---|
| 7,916,480 | B2 | 3/2011 | Woody et al. |
| 8,780,561 | B2 | 7/2014 | Danello et al. |

(Continued)

FOREIGN PATENT DOCUMENTS

| | | | |
|---|---|---|---|
| KR | 101100273 | B1 | 12/2011 |
| WO | WO2018206896 | * | 11/2018 |

*Primary Examiner* — Matthew W Van Oudenaren

(74) *Attorney, Agent, or Firm* — David B. Kelley; Carlson, Gaskey & Olds, P.C.

(57) ABSTRACT

An assembly includes a busbar of a traction battery pack, and at least one terminal of a battery cell of the traction battery pack. The at least one terminal is electrically coupled to the busbar. The assembly further includes a thermal exchange plate, and a thermal interface material that communicates thermal energy to the thermal exchange plate from the at least one terminal, from the busbar, or both.

14 Claims, 3 Drawing Sheets

(51) Int. Cl.

| | |
|---|---|
| ***H01M 50/249*** | (2021.01) |
| ***H01M 50/271*** | (2021.01) |
| ***H01M 50/505*** | (2021.01) |
| ***H01M 50/553*** | (2021.01) |
| ***H01M 50/591*** | (2021.01) |

(56) References Cited

U.S. PATENT DOCUMENTS

| | | | | |
|---|---|---|---|---|
| 10,396,414 | B2 | 8/2019 | Yeow et al. | |
| 10,680,297 | B2 | 6/2020 | Schoenherr | |
| 11,177,518 | B2 | 11/2021 | Hwang | |
| 2016/0064783 | A1* | 3/2016 | Chorian .............. | H01M 10/625 429/120 |
| 2018/0261992 | A1* | 9/2018 | Bower ................ | H01M 50/512 |
| 2019/0393571 | A1* | 12/2019 | Weicker .............. | H01M 50/505 |
| 2020/0161727 | A1* | 5/2020 | Phlegm ................. | F28F 21/089 |
| 2021/0013563 | A1* | 1/2021 | Park .................. | H01M 10/6556 |
| 2021/0408514 | A1 | 12/2021 | Sohag et al. | |
| 2022/0077549 | A1 | 3/2022 | Erhart et al. | |

* cited by examiner 10
18
Electric
Machine
Battery Pack
22
26
14

Vertical
38
14
Heat
Exchanger
34
90
90
94
44
90
30
30
30
30
82
30

Vertical
62
52
54
54
30
4
70
56
A
66
66
66
74
104
86
104
56
78
58
94
82
4
Heat Exchanger 52
78
66
50
86
56

100
82
50
56
56

TRACTION BATTERY PACK THERMAL MANAGEMENT ASSEMBLY AND THERMAL MANAGEMENT METHOD

TECHNICAL FIELD

This disclosure relates generally to managing thermal energy within a traction battery pack and, more particularly, to managing thermal energy within terminals and busbars of the traction battery pack.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines. The traction battery pack assembly of an electrified vehicle can include groups of battery cells.

SUMMARY

In some aspects, the techniques described herein relate to an assembly, including: a busbar of a traction battery pack; at least one terminal of a battery cell of the traction battery pack, the at least one terminal electrically coupled to the busbar; a thermal exchange plate; and a thermal interface material that communicates thermal energy to the thermal exchange plate from the at least one terminal, from the busbar, or both.

In some aspects, the techniques described herein relate to an assembly, wherein the battery cell is one of a plurality of battery cells within an battery array, the plurality of battery cells disposed atop the thermal exchange plate within the battery array.

In some aspects, the techniques described herein relate to an assembly, further including an array side cover extending along a lateral side of the battery array, wherein the thermal interface material is sandwiched between the plurality of battery cells and array side cover.

In some aspects, the techniques described herein relate to an assembly, wherein the array side cover includes at least one thermal interface material delivery aperture.

In some aspects, the techniques described herein relate to an assembly, wherein the thermal exchange plate has a wrap-around configuration with a bottom portion beneath the plurality of battery cells and opposing side portions extending along respective lateral sides of the plurality of battery cells.

In some aspects, the techniques described herein relate to an assembly, wherein the thermal interface material is sandwiched between the plurality of battery cells and the opposing side portions of the thermal exchange plate.

In some aspects, the techniques described herein relate to an assembly, wherein the thermal exchange plate includes at least one thermal interface material delivery aperture.

In some aspects, the techniques described herein relate to an assembly, wherein the at least one terminal is at least one tab terminal.

In some aspects, the techniques described herein relate to an assembly, wherein the at least one terminal is at least one terminal of a pouch-style battery cell.

In some aspects, the techniques described herein relate to an assembly, further including an insulation cover disposed between the battery cell and the busbar.

In some aspects, the techniques described herein relate to an assembly, wherein the thermal exchange plate is configured to communicate a liquid coolant or liquid refrigerant to manage thermal energy levels of the battery cell.

In some aspects, the techniques described herein relate to an assembly, further including an electrified vehicle having the traction battery pack.

In some aspects, the techniques described herein relate to an assembly, wherein the thermal interface material is an expandable foam.

In some aspects, the techniques described herein relate to an assembly, wherein the thermal interface material directly contacts the at least one terminal, the busbar, or both.

In some aspects, the techniques described herein relate to a thermal energy management method, including: thermally connecting a thermal exchange plate to at least one terminal of a battery cell of a traction battery pack, to at least one busbar of the traction battery pack, or to both.

In some aspects, the techniques described herein relate to a method, further including thermally connecting using a thermal interface material.

In some aspects, the techniques described herein relate to a method, wherein the battery cell is within a plurality of battery cells disposed atop the thermal exchange plate, wherein the terminal and the busbar are disposed on a lateral side of the plurality of battery cells, and further including sandwiching the thermal interface material between the plurality of battery cells and an array side cover.

In some aspects, the techniques described herein relate to a method, further including injecting the thermal interface material through at least one aperture in the array side cover.

In some aspects, the techniques described herein relate to a method, wherein the battery cell is within a plurality of battery cells, wherein the thermal exchange plate has a wrap-around configuration with a bottom portion beneath plurality of battery cells and opposing side portions extending along respective lateral sides of the plurality of battery cells, and further including sandwiching the thermal interface material between the plurality of battery cells and the opposing side portions.

In some aspects, the techniques described herein relate to a method, further including injecting the thermal interface material through at least one aperture in the thermal exchange plate.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details example traction battery pack assemblies that include a thermal interface material that is used to thermal energy to a thermal exchange plate from a terminal, from a busbar, or from both.

Figures 1, 2:
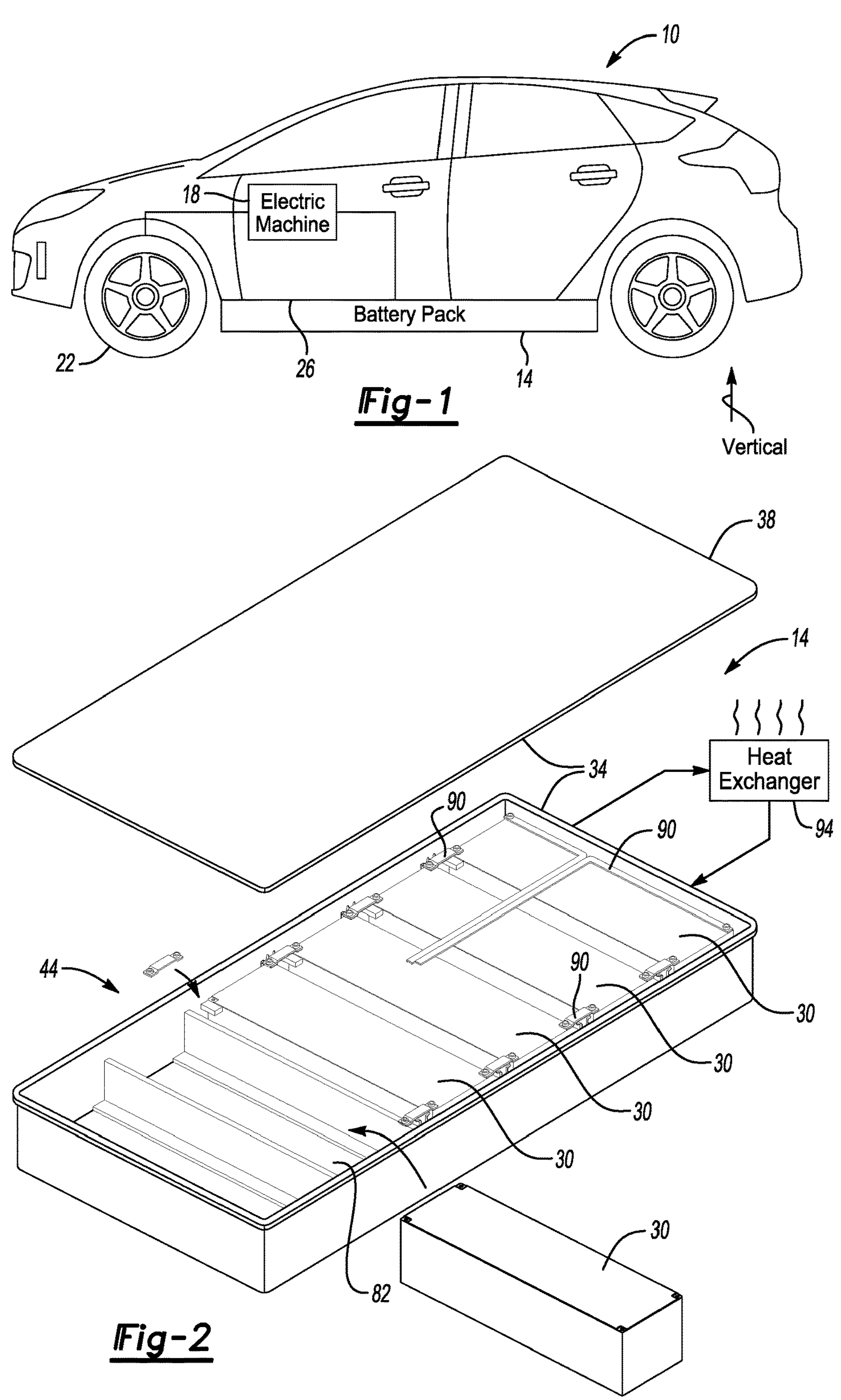
FIG. 1 illustrates a side view of an electrified vehicle having a traction battery pack.
FIG. 2 illustrates a perspective view of the traction battery pack from the electrified vehicle of FIG. 1.

With reference to FIG. 1, an electrified vehicle 10 includes a traction battery pack assembly 14, an electric machine 18, and wheels 22. The traction battery pack assembly 14 powers an electric machine 18, which can convert electrical power to mechanical power to drive the wheels 22. The traction battery pack assembly 14 can be a relatively high-voltage battery.

The traction battery pack assembly 14 is, in the exemplary embodiment, secured to an underbody 26 of the electrified vehicle 10. The traction battery pack assembly 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

Figures 3, 4, 5:
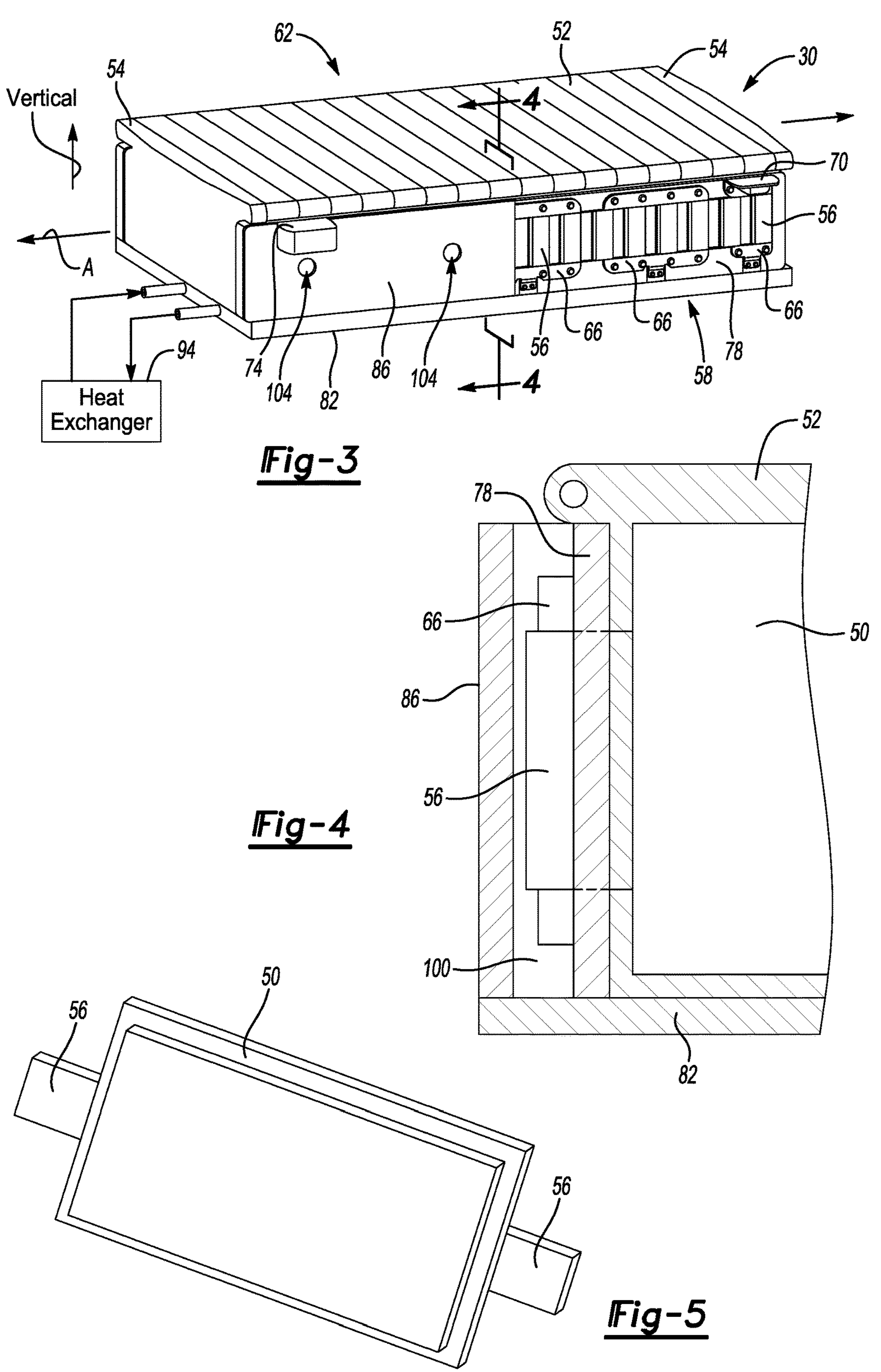
FIG. 3 illustrates a perspective view of a battery array from the traction battery pack of FIG. 2 according to an exemplary aspect of the present disclosure with selected portions of the traction battery pack omitted.
FIG. 4 illustrates a section view at line 4-4 in FIG. 3.
FIG. 5 illustrates a battery cell from the battery array of FIG. 3.

With reference now to FIGS. 2 and 3, the traction battery pack assembly 14 includes a plurality of battery arrays 30 held within an enclosure assembly 34. In the exemplary embodiment, the enclosure assembly 34 includes an enclosure cover 38 and an enclosure tray 42. The enclosure cover 38 is secured to the enclosure tray 42 to provide an interior area 44 that houses the plurality of battery arrays 30.

The battery arrays 30 each includes a plurality of battery cells 50 (or simply, "cells") stacked side-by side relative to each other. The battery cells 50 are for supplying electrical power to various components of the electrified vehicle 10.

Although a specific number of cells 50 and arrays 30 are illustrated in the various figures of this disclosure, the traction battery pack assembly 14 could include any number of arrays 30 having any number of cells 50. In other words, this disclosure is not limited to the specific configuration shown in FIGS. 2 and 3.

Referring now to FIGS. 4 and 5 with continued reference to FIGS. 2 and 3, in this embodiment, the battery cells 50 are lithium ion pouch cells. However, battery cells having other geometries (cylindrical, etc.) and/or chemistries (nickel-metal hydride, lead-acid, etc.) could alternatively be utilized within the scope of this disclosure.

The battery cells 50 are held within frames 52 and compressed along an axis A between endplates 54. The battery cells 50 each include tab terminals 56 that project outward from a first lateral side 58 of the respective array 30 and an opposite, second lateral side 62 of the respective array 30.

The arrays 30 each include a plurality of internal busbars 66, a positive terminal pad 70, a negative terminal pad 74, insulation covers 78, a thermal exchange plate 82, and side covers 86.

The internal busbars 66 are electrically coupled to selected tab terminals 56. The internal busbars 66 electrically couple together battery cells 50 within the array 30.

Within the battery pack assembly 14, external busbars 90 can be used to electrically couple together the various arrays 30 of the battery pack assembly 14. The external busbars 90 are electrically coupled to the arrays 30 through the positive terminal pad 70 and the negative terminal pad 74, which provide electrical connection points to the array 30.

The insulation covers 78 extend along the first lateral side 58 and the second lateral side 62. The tab terminals 56 extend through the insulation covers 78 to connect to the internal busbars 66.

The battery cells 50 are disposed atop the thermal exchange plate 82. In this example, the battery cells 50 are vertically above the thermal exchange plate 82. Vertical, for purposes of this disclosure, is with reference to ground and a general orientation of the vehicle 10 during operation. The thermal exchange plate 82 is shown as part of the array 30 in this example. In other examples, the thermal exchange plate 82 could be separate from the array.

The thermal exchange plate 82 includes channels. In this example, a liquid coolant is circulated through the channels to manage thermal energy levels of the battery cells 50 and other components of the array 30. The liquid coolant can take on thermal energy from the battery cells 50. The liquid coolant can then be communicated to a heat exchanger 94 outside the battery pack 14 where the thermal energy can be dispersed to ambient. In some examples, refrigerant could be circulated through the channels of the thermal exchange plate 82 instead of coolant.

The side covers 86 extend along the first lateral side 58 and the second lateral side 62 of the array 30. The side covers 86 are spaced laterally outward from the internal busbars 66 and the tab terminals 56.

The arrays 30 include a thermal interface material 100 sandwiched between the side covers 86 and the battery cells 50 of the array 30. The thermal interface material 100 directly contacts the tab terminals 56, the internal busbars 66, and the thermal exchange plate 82. The thermal interface material 100 communicates thermal energy to the thermal exchange plate 82 from the tab terminals 56 and the internal busbars 66 to the thermal exchange plate 82. This helps to cool the tab terminals 56 and the internal busbars 66.

The thermal interface material 100 can be an expandable foam.

In this example, the thermal interface material 100 is injected through a plurality of thermal interface material delivery apertures 104 in the side covers 86. The thermal interface material 100 expands to contact the tab terminals 56, the internal busbars 66, and the thermal exchange plate 82. This thermally connects the tab terminals 56 and the internal busbars 66 to the thermal exchange plate 82.

Figure 6:
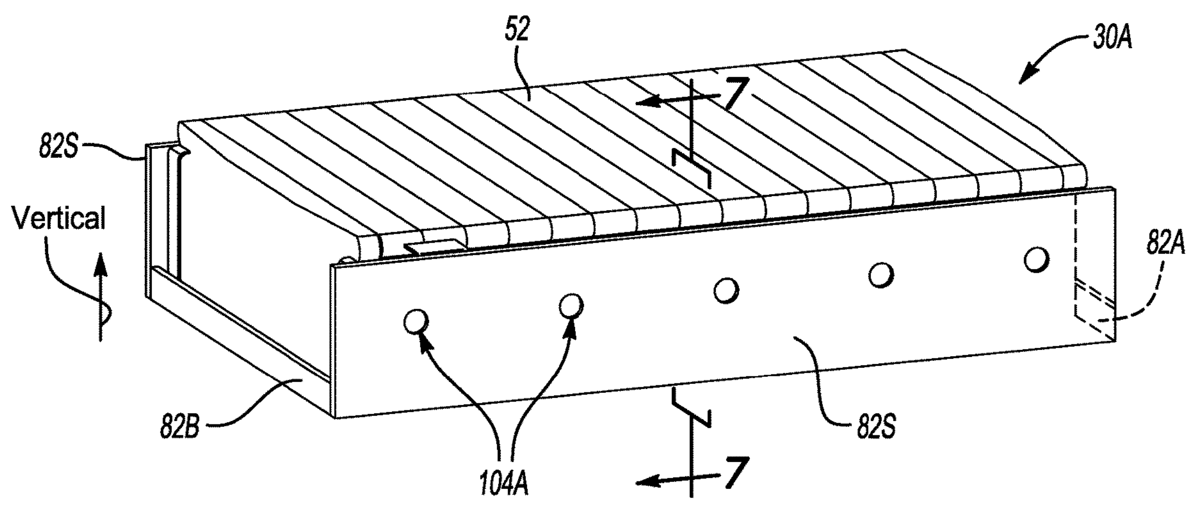
FIG. 6 illustrates a perspective view of the traction battery pack from the electrified vehicle of FIG. 1 according to another exemplary aspect of the present disclosure with selected portions of the traction battery pack omitted.
Figure 7:
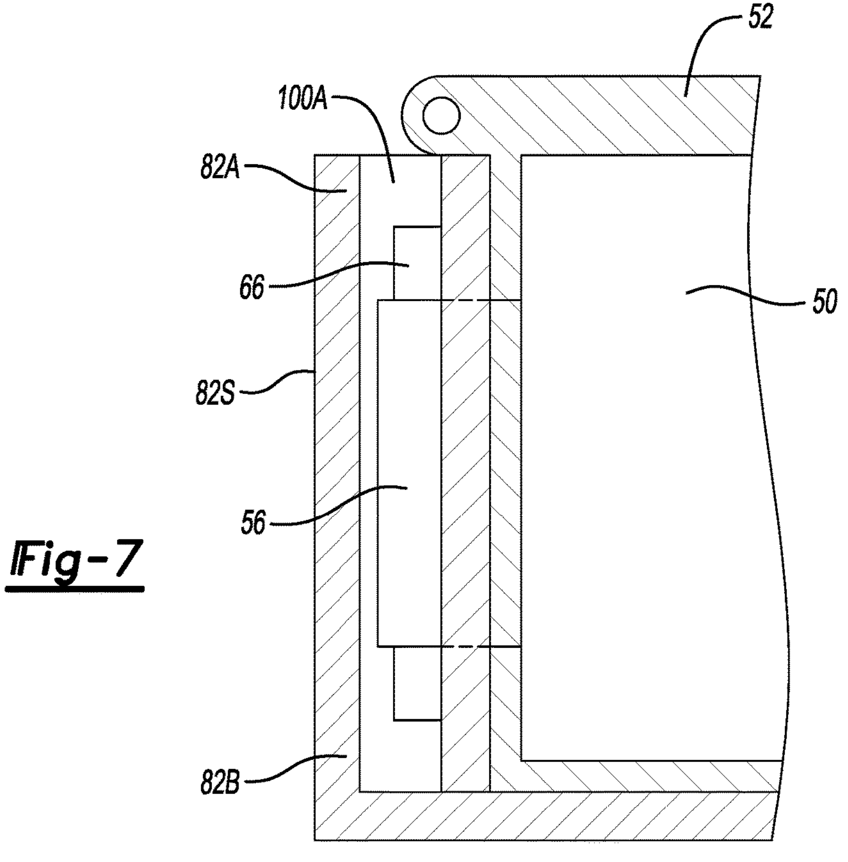
FIG. 7 illustrates a section view at line 7-7 in FIG. 6.

With reference now to FIGS. 6 and 7, in another example, an array 30A includes a wrap-around thermal exchange plate 82A, which includes a bottom portion 82B beneath the battery cells 50 and opposing side portions 82S extending along respective lateral sides of the battery cells 50. The side portions 82S extend vertically upward from the bottom portion 82B. The opposing side portions 82S are alongside the first lateral side 58A and the second lateral side 62A of the array 30A. The side portions 82S are used in place of the side covers 86 in embodiment of FIGS. 2-5.

A thermal interface material 100A is sandwiched between the wrap-around thermal exchange plate 82A and the battery cells 50 of the array 30A. The wrap-around thermal exchange plate 82A can include thermal interface material delivery apertures 104A that are used to introduce the thermal interface material 100A.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An assembly, comprising:

a busbar of a traction battery pack;

at least one terminal of a battery cell of the traction battery pack, the at least one terminal electrically coupled to the busbar;

a thermal exchange plate; and a thermal interface material that communicates thermal energy to the thermal exchange plate from the at least one terminal, from the busbar, or both, wherein the thermal interface material directly contacts the at least one terminal, wherein the thermal interface material is an expandable foam.

2. The assembly of claim 1, wherein the battery cell is one of a plurality of battery cells within a battery array, the plurality of battery cells disposed atop the thermal exchange plate within the battery array.

3. The assembly of claim 2, further comprising an array side cover extending along a lateral side of the battery array, wherein the thermal interface material is sandwiched between the plurality of battery cells and the array side cover.

4. An assembly comprising:

a busbar of a traction battery pack;

at least one terminal of a battery cell of the traction battery pack, the at least one terminal electrically coupled to the busbar;

a thermal exchange plate; and a thermal interface material that communicates thermal energy to the thermal exchange plate from the at least one terminal, from the busbar, or both, an array side cover extending along a lateral side of the battery array, wherein the thermal interface material is sandwiched between the plurality of battery cells and the array side cover, wherein the thermal interface material directly contacts the at least one terminal, wherein the battery cell is one of a plurality of battery cells within a battery array, the plurality of battery cells disposed atop the thermal exchange plate within the battery array, wherein the array side cover includes at least one thermal interface material delivery aperture.

5. The assembly of claim 2, wherein the thermal exchange plate has a wrap-around configuration with a bottom portion beneath the plurality of battery cells and opposing side portions extending along respective lateral sides of the plurality of battery cells.

6. The assembly of claim 5, wherein the thermal interface material is sandwiched between the plurality of battery cells and the opposing side portions of the thermal exchange plate.

7. The assembly of claim 6, wherein the thermal exchange plate includes at least one thermal interface material delivery aperture configured to deliver the thermal interface material into a position where the thermal interface material directly contacts the at least one terminal.

8. The assembly of claim 1, wherein the at least one terminal is at least one tab terminal.

9. The assembly of claim 1, wherein the at least one terminal is at least one terminal of a pouch-style battery cell.

10. The assembly of claim 1, further comprising an insulation cover disposed between the battery cell and the busbar.

11. The assembly of claim 1, wherein the thermal exchange plate is configured to communicate a liquid coolant or refrigerant to manage thermal energy levels of the battery cell.

12. The assembly of claim 1, further comprising an electrified vehicle having the traction battery pack.

13. A thermal energy management method, comprising:

thermally connecting a thermal exchange plate to both a busbar and at least one terminal using a thermal interface material that directly contacts the at least one terminal, wherein a battery cell of a traction battery pack includes the at least one terminal, wherein the battery cell is within a plurality of battery cells disposed atop the thermal exchange plate, wherein the terminal and the busbar are disposed on a lateral side of the plurality of battery cells, and further comprising sandwiching the thermal interface material between the plurality of battery cells and an array side cover; and injecting the thermal interface material through at least one aperture in the array side cover.

14. A thermal energy management method, comprising:

thermally connecting a thermal exchange plate to both a busbar and at least one terminal using a thermal interface material that directly contacts the at least one terminal, wherein a battery cell of a traction battery pack includes the at least one terminal, wherein the battery cell is within a plurality of battery cells, wherein the thermal exchange plate has a wrap-around configuration with a bottom portion beneath the plurality of battery cells and opposing side portions extending along respective lateral sides of the plurality of battery cells, and further comprising sandwiching the thermal interface material between the plurality of battery cells and the opposing side portions; and injecting the thermal interface material through at least one aperture in the thermal exchange plate.

* * * * *